United States Patent Office 3,437,152
Patented Apr. 8, 1969

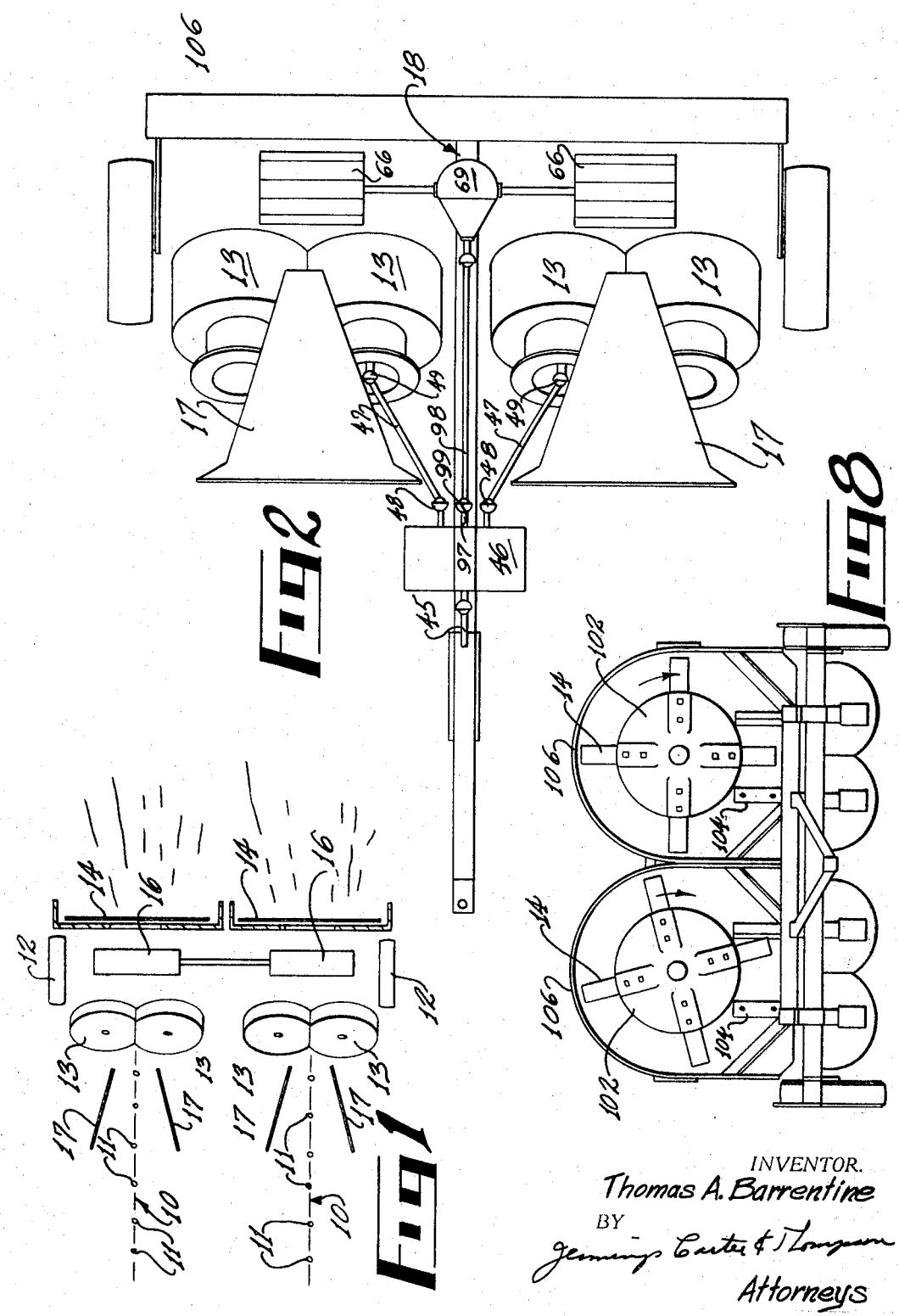

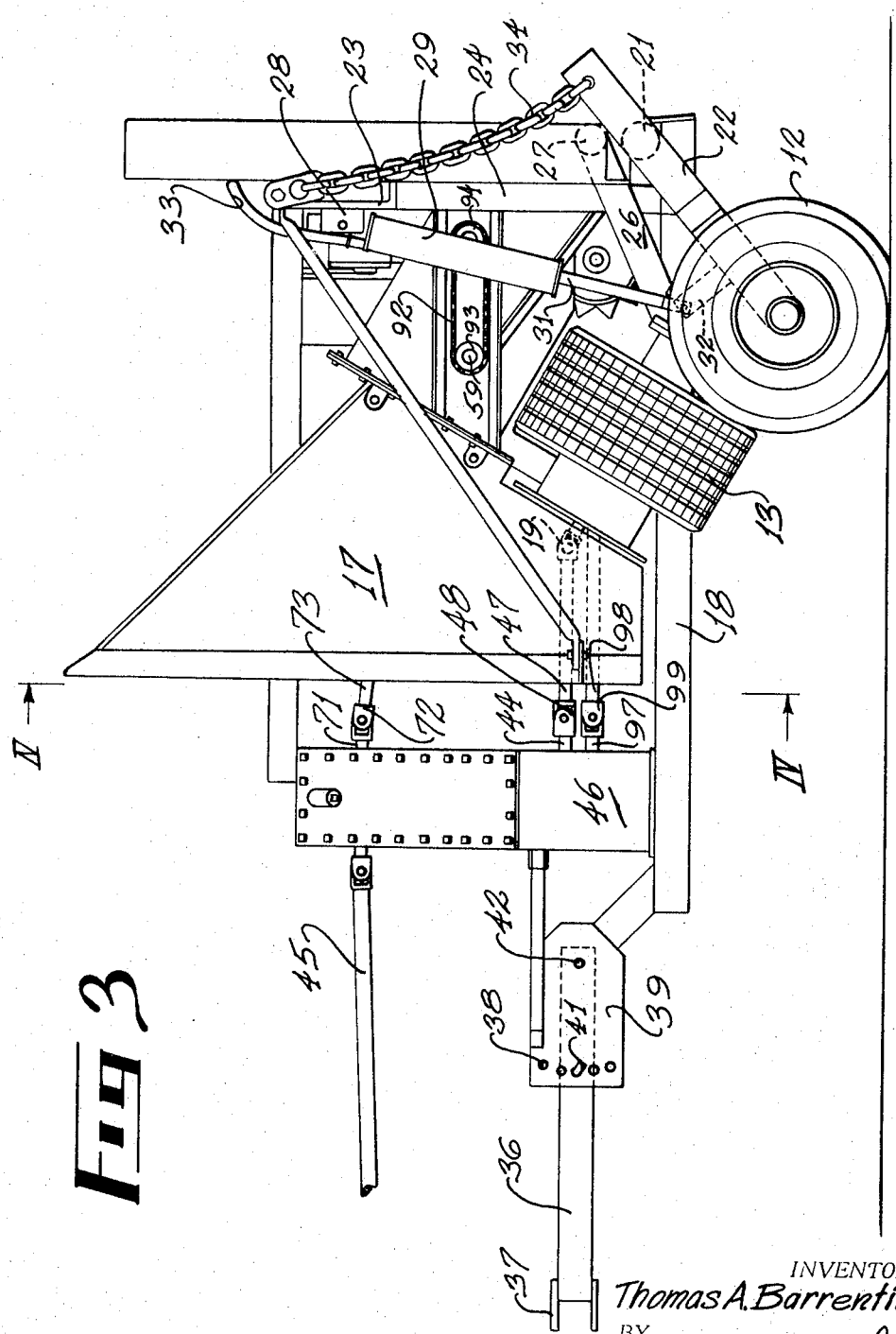

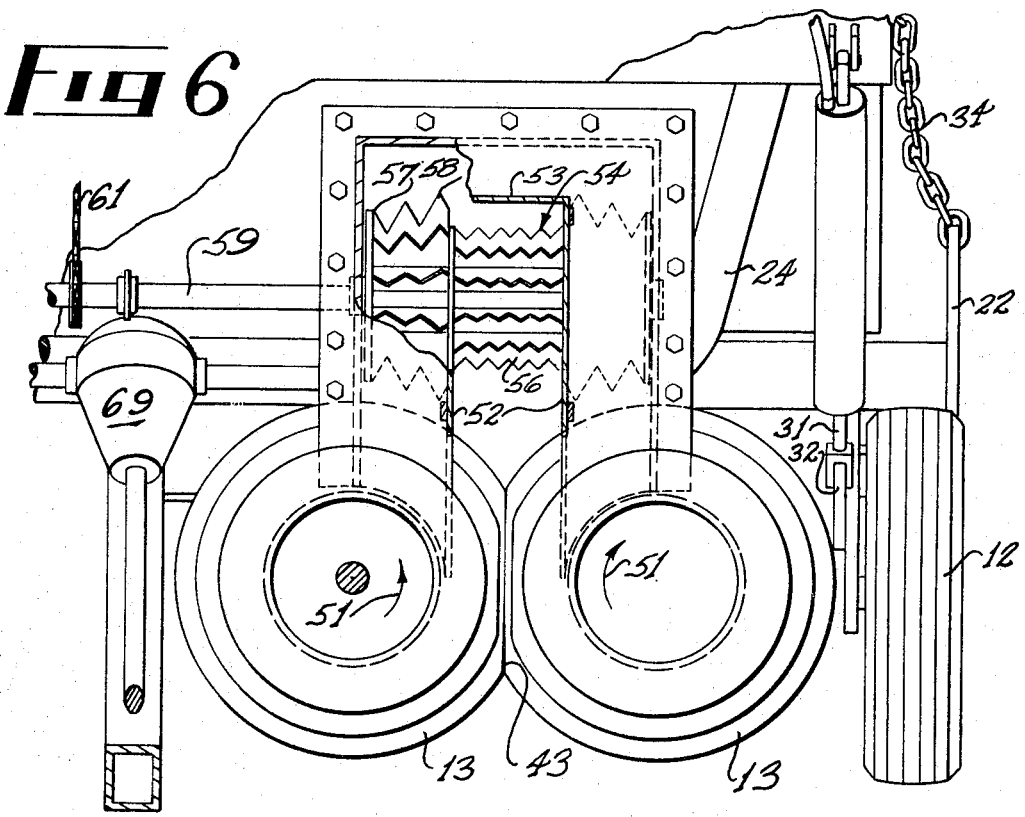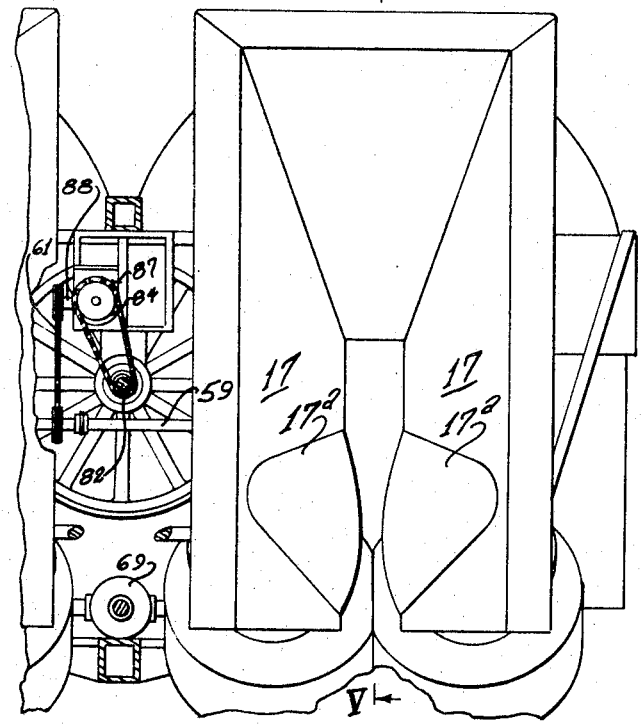

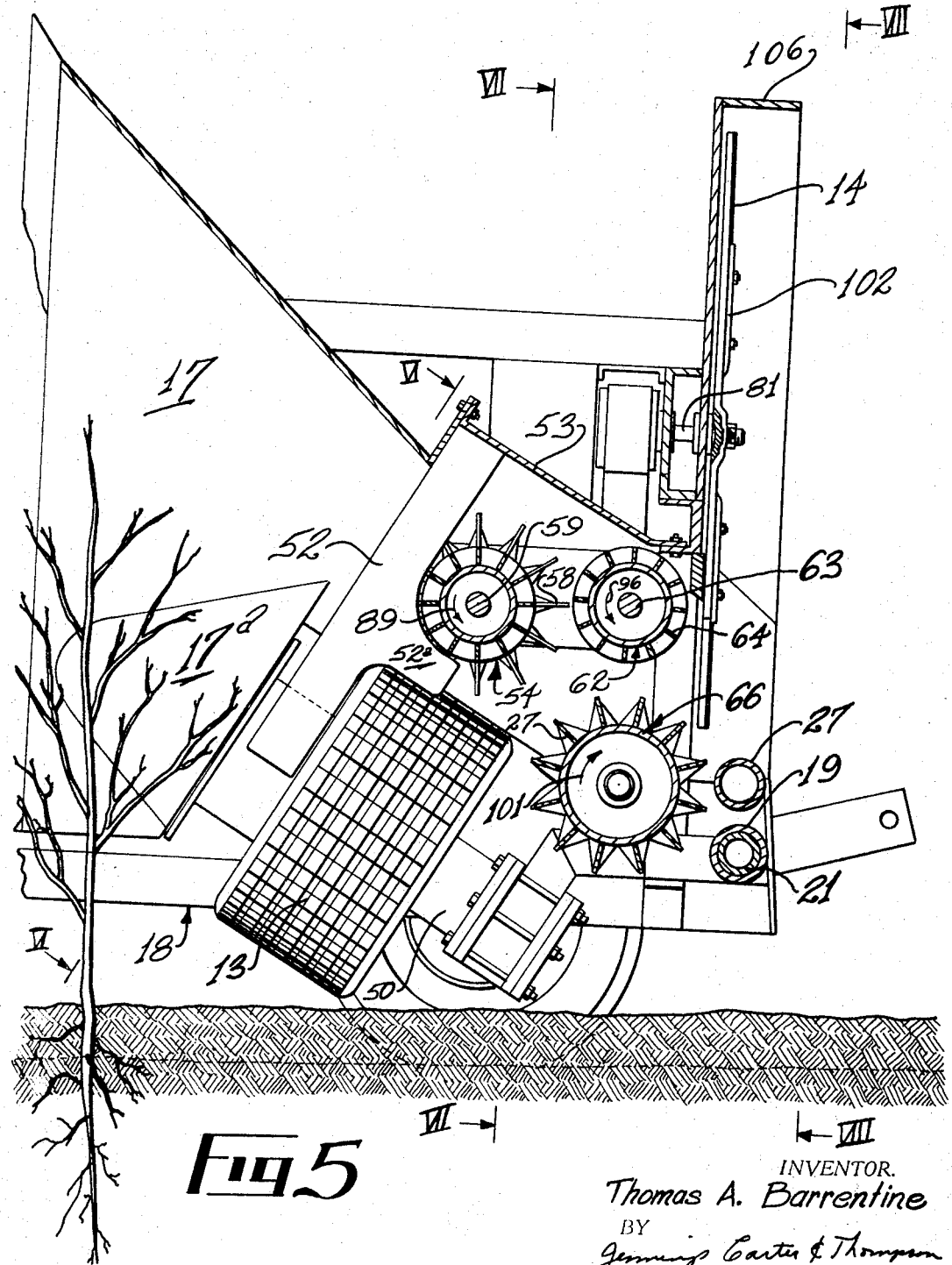

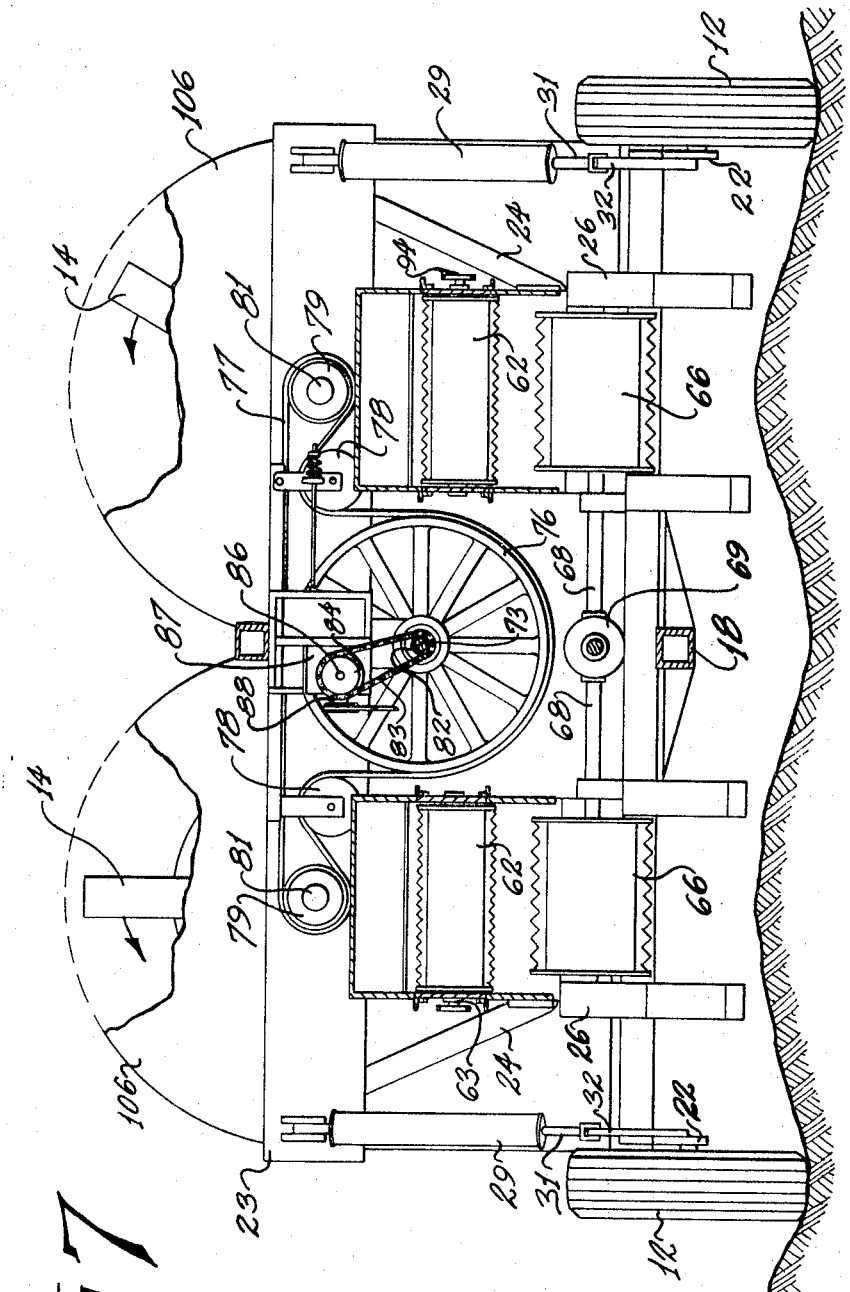

3,437,152
APPARATUS FOR PULLING STALKS
Thomas A. Barrentine, Greenwood, Miss. 38930
Filed Sept. 23, 1965, Ser. No. 489,630
Int. Cl. A01d 25/04, 45/00, 49/00
U.S. Cl. 171—58       3 Claims This invention relates to apparatus for pulling stalks and the like from the ground, for instance, the stalks of row crops remaining after the crops thereof have been harvested.

In the cultivation of certain crops it is desirable, after the crops have been harvested, to pull the stalks from the ground and shred or otherwise cut them, throwing the comminuted stalks back onto the ground for mulching purposes. For instance, cotton grown in certain sections of the country have been found to be root infested with a disease, apparently of a fungus nature, which if left in the soil continues to infest other crops. However, if the roots are pulled and exposed to sunlight such fungus is destroyed, or at least rendered innocuous to crops subsequently planted in the same soil. Suffice it to say that there exists in the agricultural art a need for an improved apparatus for pulling various kinds of stalks and for chopping them sufficiently fine to act as a mulch and to aerate them, destroying root fungus and the like.

In view of the foregoing, the prime object of my invention is to provide apparatus by means of which stalks growing from the ground, especially stalks of row crops, are pulled in an efficient, time saving manner.

Specifically, I propose to engage each of the stalks of a row thereof between cooperating, upwardly moving, translatably supported friction surfaces whereby the stalks are gripped above the level of the ground and the roots pulled from the earth.

My invention further contemplates an improved apparatus for pulling rows of stalks embodying a pair of translatably supported wheels, the peripheries of which are covered with resilient material such as rubber, together with means to press the wheels together and rotate them in unison with the adjacent surfaces moving upwardly, whereby as stalks enter the nip between such wheels the stalks are frictionally gripped and thus pulled from the ground.

More specifically, I propose apparatus of the character designated in which the wheels carry pneumatic tires of relatively wide tread and in which said forced-together tires are disposed for positive rotation in a plane lying at an angle to the vertical, whereby as such wheels move down the row, the stalks are firmly engaged therebetween and are pulled upwardly and rearwardly relative to the direction of the movement of the apparatus as a whole.

I further propose apparatus in which the stalks are moved rearwardly of said pulling wheels, without stopping, there to be engaged by stalk cutting or shredding means, whereby the cut stalks are strewn upon the ground from which they have just been removed.

Another object of my invention is to provide pneumatic tired stalk pulling wheels which are pressed together sufficiently both to grip the stalks and to cause one of the same to turn in unison with the other when power is supplied to the other thereof.

Apparatus illustrating the constructional features of my invention is shown in the accompanying drawings forming a part hereof in which:

FIG. 1 is a wholly diagrammatic plan view of a piece of equipment carrying out my improved process by travelling down a pair of spaced, parallel rows of crops, pulling the stalks and comminuting them;

FIG. 2 is a wholly diagrammatic plan view of my improved apparatus;

FIG. 3 is a side elevational view with the stalk pulling apparatus raised above the ground, out of operative position, for transport from place to place;

FIG. 4 is a detail view taken generally along line IV—IV of FIG. 3 with certain parts being omitted for the sake of clarity;

FIG. 5 is a detail sectional view taken generally along line V—V of FIG. 4;

FIG. 6 is a detail sectional view taken generally along line VI—VI of FIG. 5, certain of the parts being omitted and broken away for the sake of clarity, the view illustrating only one side or substantially one half of the apparatus;

FIG. 7 is a detail sectional view taken generally along line VII—VII of FIG. 5, and FIG. 8 is a detail rear view on line VIII—VIII of FIG. 5 drawn to a reduced scale.

Referring now to the drawings for a better understanding of my invention the function of, my improved apparatus is indicated diagrammatically in FIG. 1. That is, I show a path of spaced, parallel rows 10 in which are planted individual plants 11 which project above the ground. Wholly in diagrammatic manner in this figure, I illustrate ground engaging wheels 12 which support sets of rotary grippers in the form of cooperating rubber tired wheels 13. As will later appear, these wheels are pressed together so as to form a grip or nip between them into which the stalks are guided as the apparatus moves down the rows.

Rearwardly of the gripping units 13 are comminuting means such as rotary knives 14. The material is delivered rearwardly, that is, to the right, as viewed in FIG. 1, of the wheels 13 by certain intermediary transfer means indicated generally by the numeral 16.

From what has just been described, it will be seen that when the entire apparatus is moved down the rows to the left as viewed in FIG. 1, the plants are directed by the guides 17 into the nips of the resiliently surfaced wheels 13, which are set at an angle to the horizontal as also will later appear, so that the stalks are pulled upwardly and backwardly. From here, through suitable means to be described, the stalks move into the cutters where they are shredded and are strewn upon the ground behind the moving apparatus.

Referring now to the remaining figures of the drawings, my improved apparatus comprises a main frame indicated generally by the numeral 18 and on which substantially all of the operating parts are mounted. Secured to the frame 18 and extending transversely of the apparatus is a tube 19. Rotatably mounted in tube 19 is a tube 21. The tube 21 projects outwardly of the tube 19. At each side of the apparatus are wheel supporting bars 22 which are welded to the ends of the tube 21 and which extend downwardly as illustrated particularly in FIG. 3, so as to carry the wheels 12.

The framework also includes a cross channel 23, adjacent the upper part of the apparatus. Generally vertically extending brace channels 24 are welded at their lower ends to other frame members 26. Also extending transversely across the apparatus at the rear is a second tubular member 27 and the members 26 are secured by welding to the ends of the cross member 27.

Pivotally connected to a bracket 28 carried by the cross member 23 is a fluid pressure cylinder 29. A piston rod 31 of the cylinder 29 connects to a bracket 32 secured to the topside of the member 22. It will be understood that the parts just described are duplicated each side of the machine as clearly shown in FIG. 7. Fluid under pressure under control of suitable valves, not shown, is applied to the cylinders 28 through lines 33 from a suitable source, not shown. Therefore, it will be apparent that when the piston rods 31 are extended the entire framework is raised from the ground, thus raising the rotary gripping units 13 to inoperative position relative to the stalks to be pulled. Conversely, when pressure is released from the lines 33, the weight of the apparatus brings the gripping unit 13 down into the operating position illustrated in FIG. 5, ready for the apparatus to move down the rows 10 to pull the stalks therefrom. Safety chains indicated at 34 may be provided to take the pressure off the cylinders 29, thus to hold the apparatus in the inoperative position of FIG. 3. Naturally, when the apparatus is to be lowered to the position shown in FIG. 5, the chains are manually released at their upper ends from the brackets provided.

As will be apparent, my improved apparatus is disposed to be towed by a tractor or the like. Thus, a tow bar 36 having a hitch point 37 is provided. Further, by means of a series of holes 38 in a forward plate 39 carried at the end of the framework 18, and by means of removable pin 41, I am enabled to adjust the elevation of the tongue. It will be understood that the tongue is pivoted adjacent its rear as at 42 in the plates 39.

As before stated, the gripping units 13 preferably are in the form of pneumatic tired wheels. They are so positioned relative to each other that they are in firm, compressive engagement to the extent that there exists between them the flat surface illustrated clearly in FIG. 6 and shown at 43. Further, the inboard ones of each of these pairs of wheels is disposed to be positively driven by means of a power takeoff 44, in the case shown being the output shaft of a gear box 46 mounted on the framework 18. Power may be put into the gear box through a power shaft 45 from a tractor or the like, not shown. In all events, through a drive shaft 47 and a pair of universal joints 48–49, each of the innermost or inboard wheels 13 is driven into the direction of the arrow 51, FIG. 6, namely, with its lowermost surface moving upwardly. Each wheel 13 has a forward hub extension 13ᵃ on the outer end of which is a disc 13ᵇ.

It will further be noted that the wheels are mounted for rotation on bearings 50. The axes of these bearings are such that the wheels run in a common plane which is inclined approximately 22° from the vertical. In other words, and as is shown in the drawings, the bottoms of the wheels precede the tops thereof, with respect to the direction of movement of the apparatus down the row of stalks to be pulled. While the angle of inclination is not precisely critical, nevertheless it is desirable that the sets of gripping wheels run in a plane which is inclined to the horizontal.

As before stated, it is preferable to provide a guiding member 17 to direct the stalks into the nips of the gripping wheels 13. Further, I have found it desirable to provide in the position shown, on each of the guides 17, inwardly projecting raised portions which narrow the space between the guides just ahead of the bite between the wheels. These are indicated at 17ᵃ in the drawings. Furthermore, and as shown in FIG. 5, I provide baffles 52 which have rearwardly projecting fingers 52ᵃ lying generally over the periphery of the wheels 13. A top plate 53 covers the baffles.

Mounted in suitable transverse bearings, immediately over the pairs of wheels 13, are overhead conveyor rollers indicated generally by the numeral 54. The rollers 54, at their centers, that is, over the gripping surface 43 between the wheels, are provided with a plurality of radially disposed, relatively short plates 56 having serrated outer edges. On their outer ends the rollers 54 are provided with a plurality of radially extending plates having serrated edges, the outermost ones 57 of which are shorter than the innermost ones 58 thereof. This configuration of the serrated edges makes the outer sections of the rollers more nearly fit the curved contour of the wheels 13.

The rollers 54 are mounted on a common shaft 59 in suitable bearings. Power is supplied to the shaft 59 through a chain 61 from a source presently to be described.

Rearwardly of the rollers 54 are cooperating rollers indicated generally by the numeral 62. These rollers are on shafts 63 mounted in suitable bearings and driven as hereinafter described. The rollers 62 are provided with radially disposed plates 64 which run with close running fit to the longest of the serrations 58 on the rollers 54.

Mounted beneath the rollers 62 are still further rollers indicated generally by the numeral 66 and which have a plurality of plate-like teeth 67 projecting from the periphery thereof. These rollers are mounted on shafts 63 which are driven from a gear box 69 as shown in FIG. 7.

Also projecting rearwardly from the gear box 46 is a power output shaft 71. Through a universal joint 72 a shaft 73 drives an idler belt wheel 76, see FIG. 7. Passing around the idler belt wheel is a flat belt 77. The belt 77 passes over idler rolls 78 and around pulley 79 fast on shafts 81.

Fast on the shafts 73 adjacent the belt wheel or pulley 76 is a sprocket 82 over which passes a chain 83. The chain 83 passes about a second sprocket 84 in turn fast on the input shaft 86 of a gear box 87. The gear box 87 has an output shaft 88 carrying a sprocket over which the upper loop of the chain 61 passes. Thus, power is supplied from the gear box through the shaft 73 to the gear box 87 and hence to the shaft 59, in turn rotating the rollers 54 in the direction of arrow 89, FIG. 5.

As best shown in FIG. 3, chains 92 pass over sprockets 93 on shaft 59 and in turn pass over sprockets 94 on the ends of shafts 63, whereby the rollers 62 are driven in the direction of the arrows 96, FIG. 5.

The gear box 69 is driven from a power output shaft 97 at the lower part of the gear box 46. A shaft 98 is driven through a universal joint 99 from the output shaft 97, thus to rotate the lower rollers 66 in the direction of the arrows 101, FIG. 5.

Mounted on shafts 81 and disposed for rotation in a vertical plane are high speed cutters 102 carrying cutting knives 14. As best shown in FIG. 8, the cutting knives cooperate with stationary blades 104 so that as the material is delivered rearwardly it is shredded and comminuted. Further, I may provide housings 106 about the cutters so that the material is thrown rearwardly as being distinguished from being thrown at random outwardly of the machine as it is cut.

From the foregoing, it will be apparent that I have devised an apparatus for removing stalks and the like from the ground. As stated, with my improved apparatus attached behind a tractor having a power takeoff, it will be apparent that supplying power through the input shaft 45 drives the output shafts 44, 71 and 97, in turn driving the pulling elements 13, as well as the several rollers. As the machine moves down the rows, the stalks growing from the ground are successively engaged between the nips of the pairs of wheels 13 whereby they are moved upwardly. As they emerge from the top of the bites between the rollers they are engaged by the serrated, radially extending plates projecting from the periphery of the rollers 54, whereby they are thrown slightly downwardly and rearwardly, directly onto the plate-like projections 67 of the rotating rollers 66. The rollers 62, being located rearwardly of rollers 54 and above rollers 66, tend to confine the material to a rearward path, pushing it outwardly directly into the path of the rotating knives 14, which, in cooperation with the fixed knives 104 cause a violent shredding and comminuting of the stalks.

As a specific example as intended in no way as a limitation apparatus which has proved satisfactory, has incorporated on each wheel 13 a pneumatic rubber tire, approximately 17 inches in diameter by 10 inches across the tread. I have run these at a speed of about 147 revolutions per minute. At this speed of the tires the rollers 54 were operated at about 343 r.p.m., rollers 62 at about 343 r.p.m., and rollers 66 at about 184 r.p.m. With these speeds the cutters were run at approximately 1650 r.p.m.

In use, I prefer to lower the wheels 13 as close to the ground as is practical without dragging. The purpose of this is to grasp the stalks to be pulled as near to the ground level as possible.

I have successfully used my improved apparatus in pulling the stalks of those varieties of cotton which have the longest tap roots. Further, I have pulled such stalks while the apparatus was moved over the ground at about two and one-half miles per hour, and the efficiency of the apparatus is extremely high in that very few of the stalks are missed. Naturally, some few of them will break off, depending upon their individual condition and dryness, but for all practical purposes, I am enabled quickly and efficiently to remove all stalks from rows of the same.

What I claim is:

1. In apparatus for pulling stalks from a row of the same,
   (a) a frame supported from the ground for translatory movement down the row of stalks to be pulled,
   (b) a pair of pneumatic tired wheels having their peripheries in pressure contact with each other and thus forming a nip for the stalks,
   (c) means mounting the wheels for rotation in unison and in a plane at an angle to the ground and with the lower end of said nip therebetween preceding the upper end when considering the direction of movement of the apparatus,
   (d) conveying means located immediately adjacent the upper, discharge end of the nip and disposed as stalks are discharged from the nip to move the stalks rearwardly, and
   (e) means immediately rearwardly of the conveying means effective to engage the rearwardly moving stalks and comminute the rearward ends thereof while the forward portions are still engaged between said nip.

2. Apparatus as defined in claim 1 in which the conveying means is a pair of rollers spaced one behind the other and located above and rearwardly of the upper end of the nip between said wheels, and a second roller located below the upper end of the nip between said wheels, whereby the stalks are conveyed rearwardly of the wheels by said rollers in a substantially horizontal path.

3. Apparatus as defined in claim 1 in which the means to communicate the stalks embodies a set of driven rotary cutting blades, means mounting the blades for rotation in a plane generally normal to the path of rearward movement of the stalks, the plane of rotation of said blades being located immediately adjacent the rear end of said conveying means, whereby the stalks are engaged by the blades while being moved rearwardly by the wheels and the conveying means.

References Cited

UNITED STATES PATENTS

| | | | |
|---|---|---|---|
| 2,660,013 | 11/1953 | Priestley | 171—58 |
| 2,569,307 | 9/1951 | Haapala | 56—500 |
| 2,777,267 | 1/1957 | Thompson | 56—16 XR |
| 2,924,283 | 2/1960 | Macphee | 171—58 |
| 3,127,723 | 4/1964 | Procter et al. | 56—16 |

ANTONIO F. GUIDA, *Primary Examiner.*

U.S. Cl. X.R.

56—16, 500